United States Patent [19]

Wilson

[11] 3,898,155

[45] Aug. 5, 1975

[54] HEAVY OIL DEMETALLIZATION AND DESULFURIZATION PROCESS

[75] Inventor: Geoffrey R. Wilson, Pittsburgh, Pa.

[73] Assignee: Gulf Research & Development Company, Pittsburgh, Pa.

[22] Filed: Dec. 19, 1973

[21] Appl. No.: 426,363

[52] U.S. Cl. .............................. 208/216; 208/251 H
[51] Int. Cl. ............................................. C10g 23/02
[58] Field of Search ....................... 208/216, 251 H

[56] References Cited
UNITED STATES PATENTS

| | | | |
|---|---|---|---|
| 3,594,312 | 7/1971 | Christman et al. | 208/216 |
| 3,630,888 | 12/1971 | Alpert et al. | 208/216 |
| 3,666,685 | 5/1972 | O'Hara | 208/251 H |
| 3,714,032 | 1/1973 | Bertolacini et al. | 208/216 |
| 3,803,027 | 4/1974 | Christman et al. | 208/216 |

Primary Examiner—Delbert E. Gantz
Assistant Examiner—G. J. Crasanakis

[57] ABSTRACT

Heavy oils containing sulfur and at least 80 parts per million metals are simultaneously demetallized and desulfurized by contacting the oil under hydrogenation conditions with a catalyst composition comprising a Group VI-B metal and at least one Group VIII metal composited with alumina, said catalyst composition having an average pore diameter greater than 100 A units, from 10–40 percent of the total pore volume in macropores and from 60–90 percent of the total pore volume in micropores, and at least 80 percent of the micropore volume being in pores having a diameter of at least 100 A units.

6 Claims, No Drawings

HEAVY OIL DEMETALLIZATION AND DESULFURIZATION PROCESS

BACKGROUND OF THE INVENTION

In the catalytic desulfurization of heavy oils it is known that desulfurization activity is increased by decreasing the average diameter of the pores for a particular pore volume and thereby increasing the effective surface area of the catalyst. It has also been established that the active life of the catalyst containing small diameter pores is shortened in proportion to the concentration of impurities such as metals found in the heavy oils. These metals are absorbed on the catalyst, blocking the pores and deactivating the desulfurization catalyst. The most common metallic contaminents are vanadium and nickel, although other metals including iron, copper, and zinc are often present.

Although some metals occur as suspended metal oxides or sulfides or water-soluble salts and can be separated, at least in part, from the oil by filtration, water-washing, electrical desalting, or other physical means, the major portion of the metals are present in the oil as thermally stable metallo-organic complexes such as metal porphyins and derivatives thereof which are not susceptible to separation from the oil by physical methods. Most of the metallo-organic complexes are associated with the asphaltenes and so become concentrated in residual or heavy oil fractions.

It has been noted above that the presence of metals in the heavy oil charge to a catalytic desulfurization process reduces desulfurization activity of the catalyst. The presence of metallo-organic complexes where the concentration of the metal is as low as 10 parts per million (ppm) will also adversely affect other oil process steps. For example, when a hydrocarbon charge stock contains metallo-organic compounds such that the concentration of the elemental metal is in excess of about 3.0 ppm and is subjected to hydrocracking or catalytic cracking for the purpose of producing lower boiling compounds, the metals deposited upon the catalyst produce increasingly excessive amounts of coke, hydrogen and light hydrocarbon gases at the expense of more valuable liquid product. Additionally, other catalytic processes are adversely affected by the presence of metals in the charge stock, these processes include catalytic reforming, isomerization and hydrodealkylation.

Various methods have been proposed for separating metals and sulfur from heavy oils. Normally, the methods involve at least a two-step process such as described in U.S. Pat. No. 3,696,027. The process of the cited patent comprises passing the heavy oil at an elevated temperature and pressure, and in the presence of hydrogen, through a thick bed of macropore catalyst particles having high metals capacity and low desulfurization activity. The effluent from the macropore catalyst bed is passed at an elevated temperature and at an elevated pressure, in the presence of hydrogen, through a fixed bed of moderately active desulfurization catalyst particles. The effluent from the bed of moderately active desulfurization catalyst particles is thereafter passed at an elevated temperature and at an elevated pressure, in the presence of hydrogen, through a fixed bed of highly active desulfurization catalyst particles.

Obviously, if a single process step could be employed to simultaneously demetallize and desulfurize heavy oils a substantial commercial advantage would be obtained in the refining of such heavy oils. The simultaneous demetallization and desulfurization of heavy oils would be particularly advantageous as applied to heavy oils containing at least 50 ppm metals and greater than 1.0 weight percent sulfur.

Accordingly, an object of the invention is to provide an improved process for the simultaneous demetallization and substantial desulfurization of heavy oils.

Another object of the invention is to provide a process for the preparation of an improved demetallization and desulfurization catalyst composition.

Yet another object of the invention is to provide an improved demetallization and desulfurization catalyst composition.

Other objects, advantages and features of the invention will be readily apparent to those skilled in the art from the following description and appended claims.

SUMMARY OF THE INVENTION

By the invention simultaneous demetallization and desulfurization of heavy oils containing at least 50 ppm metals is obtained under hydrogenation conditions by employing a catalyst composition comprising a Group VI metal and at least one Group VIII metal composited with a refractory oxide, said catalyst composition having from 10 to 40 percent of the total pore volume in macropores and from 60 to 90 percent of the total pore volume in micropores, at least 80 percent of the micropore volume being in pores having a diameter of at least 100 A units, said catalyst composition further having a total pore volume of at least 0.5 ml per gram, an average pore diameter greater than 100 A units, and a surface area of at least 100 square meters per gram. Optionally, the catalyst composition can contain a promoter selected from the Group I, Group II, and Group IV-B metals.

DESCRIPTION OF THE INVENTION

It has been discovered that simultaneous demetallization and desulfurization of a heavy oil can be obtained by employing a catalyst composition having a controlled distribution of micropores and macropores. As employed in this specification, the term "macropores" refers to that portion of the total pore volume contained in pores having a pore diameter of greater than 600 A units as determined by the test procedure described in "An Instrument For the Measurement of Pore Size Distribution by Mercury Penetration" by Winslow and Shapiro in ASTM Bulletin, February, 1959, hereinafter referred to as the mercury test method and incorporated herein by reference thereto. The term "micropores" refers to that portion of the total pore volume contained in pores having a diameter in the range of 0–600 A units as determined by the nitrogen adsorption method described by E. V. Ballou, O. K. Dollen, in "Analytical Chemistry," Volume 32, page 532, 1960, incorporated herein by reference thereto and hereafter referred to as the nitrogen test method. The "total pore volume" of the catalyst composition as employed herein refers to the sum of the micropore volume and the macropore volume.

The invention is applicable to the simultaneous demetallization and desulfurization of a heavy oil containing sulfur and at least 50 ppm metals. The invention is particularly applicable to the simultaneous demetallization and desulfurization of a heavy oil containing at least 50 ppm metals and at least 1.0 weight percent sulfur. The term "heavy oil" refers to those hydrocarbon fractions boiling above 800°F. (427°C.) and containing at least 1.0 percent by weight Conradson Carbon Residue.

As employed in this invention, the term "demetallization" refers to the separation of at least 60 percent of the metals contained in the heavy oil feed by a single pass of the heavy oil feed through the reaction zone containing the novel catalyst composition. The term "desulfurization" refers to the separation of at least 60 percent of the sulfur contained in the heavy oil feed to the reaction zone.

In the preparation of the novel catalyst compositions of this invention, a refractory oxide support is employed with the support material having from 10–40 percent of the total pore volume in macropores and from 60–90 percent of the total pore volume in micropores, at least 80 percent of the micropore volume being in pores having a diameter of at least 100 A units. Additionally, the support material should have a pore volume as determined by the nitrogen method of at least 0.45 (preferably at least 0.7) milliliter (ml) per gram, a total pore volume of at least 0.55 (preferably at least 0.8) ml per gram, and a surface area of at least 100 (preferably 150) square meters per gram. Although not to be limited thereto, desirably the minimum particle diameter of the support material employed in forming the catalyst composites of this invention falls within the range of 1/20–1/60 inch. Suitably, the support material is selected from the refractory oxides such as alumina, silica, magnesia, boria, zirconia, titania and mixtures of such refractory oxides.

The refractory oxide support material can be dried to remove any free water therefrom. Typically, the support can be dried at a temperature of 250°F. (121°C.) for a time ranging from 4–24 hours. Thereafter, the support can be calcined at a temperature in the range of 800°–1600° F. (427°–871° C.) in an oxygen-containing atmosphere, such as air, for a period ranging from 1–24 hours prior to compositing the support with the hydrogenating materials.

The catalyst composites of this invention contain a hydrogenating component selected from the metals of Group VI-B and at least one metal component selected from Group VIII. The concentration of the Group VI metal can range from 5–40 weight percent of the catalyst composite and the concentration of each Group VIII metal can range from 0.1–15 weight percent of the catalyst composite. In addition to these hydrogenating components the catalyst composite can optionally contain 0.1–5.0 weight percent of a metal selected from Group I, Group II, or Group IV-B.

The preparation of the catalyst composite as hereafter described will be specifically directed to a nickel-cobalt-molybdenum-on-alumina catalyst composite by a two-step impregnation method, although it will be understood by those skilled in the art that other conventional methods of compositing the hydrogenation materials and support material can be employed and that the described method of impregnation is also equally adaptable to other hydrogenation materials and refractory oxide supports.

In the two-step impregnation of the alumina support, extruded alumina pellets pretreated by the above-described procedure can be admixed with an aqueous solution of salts such as ammonium molybdate, ammonium paramolybdate, molybdenum pentachloride or molybdenum oxalate so as to obtain a catalyst composite containing from 5–40 weight percent of molybdenum. The wet impregnated alumina can then be dried by, for example, employing a temperature of 250° F. (121° C.) for 24 hours.

Thereafter, the alumina support impregnated with the molybdenum can be contacted with an aqueous solution of nickel nitrate and cobalt nitrate. Sufficient nickel nitrate and cobalt nitrate can be admixed with the alumina support so as to provide a catalyst composite containing a total of from 0.1–15 weight percent of the nickel and cobalt metals. The wet catalyst composite can then be dried in a second drying step by employing a temperature of, for example, 250°F. (121°C.) for 24 hours. Following the second drying step, the catalyst composite can then be calcined at a temperature in the range of 800°–1600°F. (427°–871°C.) for a period of from 1–24 hours.

Although a two-step impregnation step procedure has been described, it is within the scope of the invention, as previously indicated, to employ other methods of preparing the catalyst composite such as a single impregnation step for the addition of the hydrogenation metals to the alumina support.

The hydrogenation or desulfurization components of the prepared catalyst composite can be employed in sulfided or unsulfided form. If the sulfided form is preferred, the catalyst can be presulfided after calcination, or after calcination and reduction, by methods known in the art. The sulfiding can be conducted at a temperature in the range of 500° to 700°F. (261° to 372°C.), at atmospheric or elevated pressures. Presulfiding can be conveniently effected at the beginning of an onstream period at the same conditions to be employed at the start of the desulfurization process. The exact proportions of hydrogen and hydrogen sulfide are not critical and mixtures containing low or high portions of hydrogen sulfide can be used. Relatively low proportions are preferred for economic reasons. Elemental sulfur or sulfur compounds, such as mercaptans, can be used in lieu of hydrogen sulfide.

The catalyst composite as prepared and employed in the demetallization and desulfurization process of this invention will have from 10–40 (preferably 15–40) percent of the total pore volume in macropores and from 60–90 (preferably 60–85) percent of the total pore volume in micropores, at least 80 percent of the micropore volume being in pores having a diameter of at least 100 A units. The catalyst composite will have a nitrogen pore volume of at least 0.4 (preferably at least 0.6) ml/gram, a total pore volume of at least 0.5 (preferably at least 0.7) ml/gram, a surface area of at least 100 (preferably at least 150) square meters per gram, and an average pore diameter greater than 100 A. As employed in this specification, the average pore diameter is calculated from the total pore volume by the following equation:

$$\text{Average pore diameter} = \frac{4 \times PV \text{ (total)} \times 10^4}{\text{Surface Area}}$$

The prepared catalyst composite is employed in a single stage hydrodesulfurization process for the simultaneous demetallization and desulfurization of sulfur-containing heavy oil which also contains at least 50 ppm metals. The reactions effected pursuant to the process of this invention are carried out in the presence of the catalyst at a temperature that is maintained, after the relatively rapid elevation of temperature employed during startup, in the range of about 600° to 900°F. (310° to 483°C.), preferably 700° to 800°F. (372° to 483°C.). The reactions are effected in the presence of uncombined hydrogen partial pressures in the range of 500–3000 psig (35.2–211 kg/cm²), preferably 1500–2500 psig (105.5–176 kg/cm²). Hydrogen gas (at least 60 percent purity) is circulated through the reaction zone at the rate of 2000–10,000 (56,500–282,000 liters), preferably 4000–8000 (112,500–225,000 liters) standard cubic feet per barrel (159 liters) of feed (SCF/bbl). A space velocity in the range of 0.1 to 5.0 (preferably 0.2 to 1.5) liquid volumes of oil per volume of catalyst per hour is maintained in the reaction zone.

The heavy oil product of the single pass, single stage hydrogenation process will have had at least 60 percent and normally at least 85% of the metals separated therefrom. The following examples will demonstrate that greater than 85% demetallization can be achieved where the heavy oil feed has an exceedingly high concentration of metals (292 ppm).

Simultaneous desulfurization of the heavy oil feed is evidenced by the separation therefrom of at least 60% of the sulfur. The following examples will demonstrate that normally at least about 75% of the sulfur is simultaneously removed from a heavy feed containing a high concentration of sulfur (4.0 weight percent).

The following examples are presented to illustrate objections and advantages of the invention. It is not intended, however, to limit the invention to the specific embodiments presented therein.

EXAMPLE 1

In this example the effectiveness of the inventive process to simultaneously demetallize and desulfurize a heavy petroleum oil is demonstrated. The catalyst employed in the run of this example was characterized as follows:

| Catalyst Composition: wt % | |
|---|---|
| Nickel | 1.3 |
| Cobalt | 4.0 |
| Molybdenum | 16.0 |
| Silica | 19.7 |
| Alumina | 59.0 |
| Catalyst Size | 14 – 20 Mesh |
| Surface Area: sq. meters per gram | 159.3 |
| Average Pore Diameter: A units | 143 |
| Nitrogen Pore Volume: ml/g | 0.577 |
| Total Pore Volume: ml/g | 0.879 |
| Percent of Total Pore Volume in Pores: | |
| Having a diameter smaller than 100 A | 9.5 |
| Having a pore diameter in the range of 100–600 A | 56.1 |
| Having a pore diameter greater than 600 A | 34.4 |

The desulfurization and demetallization run was conducted employing a heavy oil feed characterized as follows:

| | | |
|---|---|---|
| Gravity: API | 15.4 | |
| Nitrogen: wt % | 0.22 | |
| Nickel: ppm | 16 | |
| Vanadium: ppm | 54 | |
| Pour Point, ASTM D97: °F | +50 | |
| Sulfur: wt % | 4.0 | |
| Carbon Residue, ASTM D524, Rams: wt % | 9.04 | |
| Viscosity, SUS, ASTM D2161: 210 F | 176.8 | |
| Distillation, Vacuum, ASTM D1160: 1 MM Pct Cond at 760 MM | | |
| 5 | 633°F | (344°C) |
| 10 | 700 | (372°C) |
| 20 | 782 | (417°C) |
| 30 | 844 | (452°C) |
| 40 | 901 | (483°C) |
| 50 | 967 | (520°C) |
| 60 | 1,027 | (553°C) |
| 70 | | |

The demetallization and desulfurization run was conducted for a period of 180 hours employing the above-defined catalyst and feed compositions. The initial temperature of the run was 700°F. (372°C.) and the final temperature of the run was 740°F. (394°C.). The run was conducted at reactor pressure of 2500 psig (171.6 kgs/cm²) with a hydrogen partial pressure of 2290 psia (161 kgs/cm²). The gas circulation rate during the run was 7500 SCF/barrel (212,500 liters/159 liters) of feed and a liquid hourly space velocity of 0.5 was maintained during the run.

At the completion of the run, analysis of the product showed that 98.4% of the metals and 88.7% of the sulfur was being separated from the heavy oil feed.

EXAMPLE 2

In this example the effectiveness of the catalyst composition of Example 1 to simultaneously demetallize and desulfurize a heavy petroleum oil having a high concentration of metals is demonstrated. The heavy oil feed employed in this run was characterized as follows:

| | | |
|---|---|---|
| Gravity: API | 18.2 | |
| Nitrogen: wt % | 0.32 | |
| Nickel: ppm | 34 | |
| Vanadium: ppm | 258 | |
| Pour Point, ASTM D97: °F | +45 | |
| Sulfur: wt % | 2.12 | |
| Carbon Residue, ASTM D524, Rams: wt % | 8.39 | |
| Viscosity, SUS, ASTM D2161: 210 F | 140.3 | |
| Distillation, Vacuum, ASTM D1160: 1 MM Pct Cond at 760 MM | | |
| 5 | 635°F | (333°C) |
| 10 | 677 | (359°C) |
| 20 | 748 | (398°C) |
| 30 | 812 | (433°C) |
| 40 | 870 | (467°C) |
| 50 | 942 | (505°C) |
| 60 | 1,058 | (569°C) |
| 70 | | |

The desulfurization and demetallization run was conducted for a period of 8 hours after the catalyst had been previously employed in a demetallization and desulfurization run for a period of 296 hours. A temperature of 760°F. was employed during the run which was conducted at a total pressure of 2500 psig (176.2 kgs/cm²). The hydrogen partial pressure during the run was 2235 psia (157.5 kgs/cm²) and the gas circulation rate was 7500 SCF/barrel (212,000 liters/159 liters). A space velocity of 0.5 liquid volume per hour per volume of catalyst was maintained during the run.

Analysis of the product indicated a concentration of nickel and vanadium of 5.4 and 3.8 parts per ppm, respectively. This corresponds to a separation of 96.5% of the metals from the feed. Seventy-four percent of the sulfur was separated from the feed during the run.

EXAMPLE 3

In this example the effectiveness of the inventive process to simultaneously demetallize and desulfurize a heavy petroleum oil employing a catalyst composite containing an alumina support is demonstrated. The catalyst employed in the run of this example was comprised of 1.3 weight percent nickel, 4.0 weight percent cobalt and 16.0 weight percent molybdenum deposited on an alumina support. The catalyst composite was characterized as follows:

| | | |
|---|---|---|
| Catalyst Average Length: inches | 0.1304 | |
| Catalyst Average Diameter: inches | 0.0312 | |
| Compacted Density: g/cc | 0.537 | |
| Surface Area: sq. meters per gram | 171.9 | |
| Average Pore Diameter: A units | 165.9 | |
| Nitrogen Pore Volume: cc/g | 0.526 | |
| Total Pore Volume: ml/g | 0.713 | |
| Percent of Total Pore Volume in Pores: | | |
| Having a diameter smaller than 100 A | 15.3 | |
| Having a pore diameter in the range of 100–600 A | 58.5 | |
| Having a pore diameter greater than 600 A | 26.2 | |

A desulfurization and demetallization run was conducted for a period of 46 hours employing the heavy oil feed of Example 1 and the above-defined catalyst composition. The initial temperature of the run was 690°F. (366°C.) and the final temperature of the run was 710°F. (377°C.). The reactor pressure during the run was 1,950 psig (137.5 kgs/cm$^2$) and the hydrogen partial pressure was 1,850 psia (130 kgs/cm$^2$). Gas circulation during the run was 7,500 SCF/barrel (212,000 liters/159 liters) of feed with a hydrogen purity of 95%. A liquid hourly space velocity of 0.88 was maintained throughout the run.

At the completion of the 46-hour run, employing the above-described heavy oil feed, analysis of the product showed that 85.7% of the metals and 75.0% of the sulfur was being separated from the heavy oil feed.

The run was conducted for an additional 72 hours as with the heavy oil of Example 2. Process conditions other than the temperature and space velocity remained the same as those employed during the first 46 hours. The liquid hourly space velocity was reduced to 0.5 after the new feed has been introduced to the catalyst for a period of 12 hours. The final temperature of the run was 740°F. (394°C.).

At the completion of the run, analysis of the product showed that 86.2% of the metals and 75.1% of the sulfur contained in the heavy oil feed were being separated therefrom.

EXAMPLE 4

In this example the effectiveness of the inventive process to simultaneously demetallize and desulfurize a heavy petroleum oil employing a catalyst composite containing an alumina support and titanium promoter is demonstrated. The catalyst employed in the run of this example was comprised of 0.5 weight percent nickel, 1.0 weight percent cobalt, 8.0 weight percent molybdenum, and 3.0 weight percent titanium deposited on an alumina support. The catalyst composite was further characterized as follows:

| | | |
|---|---|---|
| Catalyst Average Length: inches | 0.1111 | (.293cm) |
| Catalyst Average Diameter: inches | 0.0318 | (.0838cm) |
| Compacted Density: g/cc | 0.496 | |
| Surface Area: sq. meters per gram | 209.9 | |
| Average Pore Diameter: A units | 161.4 | |
| Nitrogen Pore Volume: cc/g | 0.527 | |
| Total Pore Volume: ml/g | 0.847 | |
| Percent of Total Pore Volume in Pores: | | |
| Having a diameter smaller than 100 A | 13.1 | |
| Having a pore diameter in the range of 100–600 A | 49.1 | |
| Having a pore diameter greater than 600 A | 37.8 | |

The desulfurization and demetallization run was conducted for a period of 44 hours employing the heavy oil feed of Example 1 and the above-defined catalyst composition. The temperature employed during the run was 715°F. (380°C.) with a reactor pressure of 1,950 psig (137.3 kgs/cm$^2$). The hydrogen partial pressure during the run was 1,850 psia (130.5 kgs/cm$^2$) and the gas circulation rate of 7,500 SCF/barrel (212,000 liters/159 liters) of feed with a hydrogen purity of 95% was maintained. A liquid hourly space velocity of 0.88 was maintained throughout this 44-hour period. At the completion of the 44-hour run, analysis of the product showed that 86.7% of the metals and 72.7% of the sulfur was being separated from the heavy oil feed.

The run was continued with the exception that the feed was changed to the heavy oil of Example 2 and the space velocity was reduced to 0.5. The remaining process conditions were the same as those employed during the initial run until 6 hours had elapsed. Analysis of the product at this time showed that 80.8% of the metals and 67.9% of the sulfur was being separated from the feed.

After 92 hours the temperature was raised to 740°F. (394°C.) with all other conditions remaining the same. Analysis of the product showed that at the completion of the run 89.1% of the metals and 75.1% of the sulfur in the heavy oil feed were being separated therefrom.

Although the invention has been described with reference to embodiments, references and details, various modifications and changes will be apparent to those who are skilled in the art and will contemplate to be embraced in this invention.

We claim:

1. A process which comprises contacting a heavy oil having at least 1.0 weight percent sulfur which also contains at least 50 ppm metals with hydrogen and with a catalyst composite at a hydrogen partial pressure in the range of 500 to 3,000 psig and at a temperature in the range of 600° to 900°F., said catalyst consisting essentially of a Group VI-B metal and at least one Group VIII metal composited with alumina, said catalyst having from 10 to 40 percent of the total pore volume in macropores having a pore diameter greater than 600 A units, from 60 to 90 percent of the total pore volume being in micropores, at least 80 percent of the micropore volume being in pores having a diameter of at least 100 A units, the total pore volume of said catalyst being at least 0.5 milliliter per gram, the average pore diameter of said catalyst being greater than 100 A units, and the surface area of said catalyst being at least 100 square meters per gram, the concentration of the Group VI metal being in the range from 5 to 40 weight percent of said catalyst composite and the concentration of each Group VIII metal being in the range of 0.1 to 15 weight percent of said catalyst composite, and recovering therefrom a demetallized and desulfurized heavy oil product.

2. The process of claim 1 wherein said catalyst has from 15 to 40 percent of said total pore volume in macropores, from 60 to 85 percent of said total pore volume in micropores, said total pore volume of said catalyst being at least 0.7 milliliter per gram, and the surface area of said catalyst being at least 150 square meters per gram.

3. The process of claim 1 which includes a hydrogen gas circulation rate in the range of 2,000 to 10,000 standard cubic feet per barrel of said oil, and a space velocity in the range of 0.1 to 5.0 liquid volumes of oil per volume of catalyst per hour.

4. The process of claim 1 wherein said catalyst also includes from 0.1 to 5.0 weight percent of a metal selected from the group consisting of Group I, Group II and Group IV-B.

5. The process of claim 3 wherein said catalyst comprises nickel, cobalt, molybdenum and alumina.

6. The process of claim 5 wherein said catalyst also includes titanium.

* * * * *